Sept. 18, 1956 M. M. WAHL 2,763,735

STERILIZING ATTACHMENT FOR TELEPHONES

Filed Jan. 8, 1953 2 Sheets-Sheet 1

Michael M. Wahl
INVENTOR.

BY Clarence A. O'Brien
and Harvey B. Jacobson
Attorneys

Sept. 18, 1956 M. M. WAHL 2,763,735

STERILIZING ATTACHMENT FOR TELEPHONES

Filed Jan. 8, 1953 2 Sheets-Sheet 2

Michael M. Wahl
INVENTOR.

BY Clarence A. O'Brien
and Harvey B. Jacobson
Attorneys

United States Patent Office 2,763,735

Patented Sept. 18, 1956

2,763,735

STERILIZING ATTACHMENT FOR TELEPHONES

Michael M. Wahl, Miami, Fla.

Application January 8, 1953, Serial No. 330,205

4 Claims. (Cl. 179—185)

This invention relates to an attachment for a public telephone and more particularly to a device which employs germicidal rays to sterilize the telephone handset.

The primary object of this invention resides in the provision of an attachment for existing and conventional pay telephones which is adapted to sterilize both the mouthpiece and the earpiece of the telephone handset, and which may be readily installed with a minimum of alteration or with no alteration of the telephone.

The construction of this invention features a casing in which a source of germicidal rays such as an ultra-violet lamp is installed. There is provided a floating plate for limiting the size of the openings in the casing in which the telephone handset is placed. There is further provided means for actuating the ultra-violet lamp together with a high voltage transformer for providing a suitable source of power for the source of germicidal rays.

Still further objects of the invention reside in the provision of a sterilizing attachment for telephones that is strong and durable, simple in construction and manufacture, capable of being installed on various existing public telephones, and which may be manufactured at a relative low cost for wide distribution.

These, together with the various ancillary objects and features of the invention which will become apparent as the following description proceeds, are attained by this sterilizing attachment for telephones, a preferred embodiment of which has been illustrated in the accompanying drawings, by way of example only, wherein.

Figure 1:
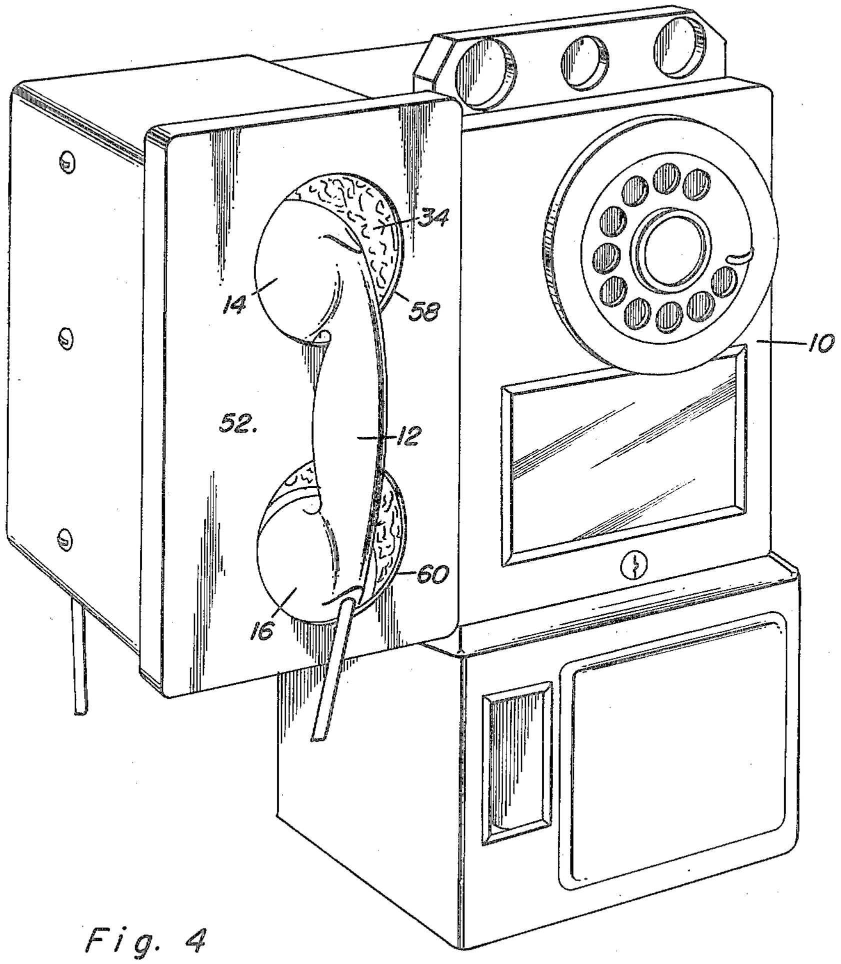
Figure 1 is a perspective view of the attachment shown installed on a conventional public telephone.
Figure 4:
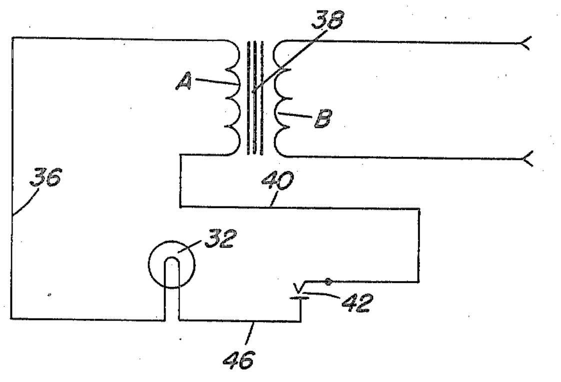
Figures 2, 3:
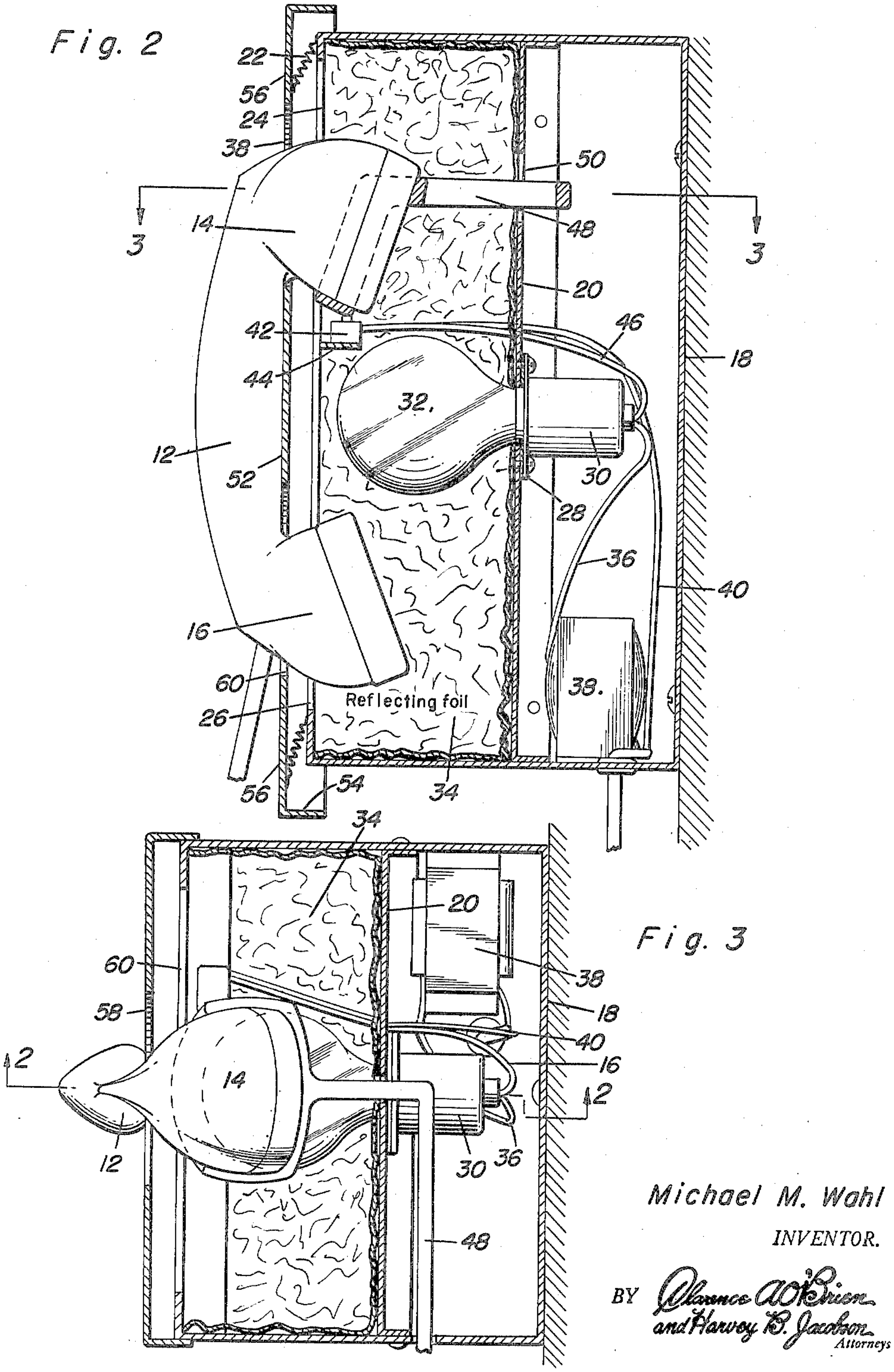
Figure 2 is a vertical sectional view as taken along the plane of line 2—2 in Figure 3 showing the construction of the interior of the casing in greatest detail.
Figure 3 is a horizontal sectional view as taken along the plane of line 3—3 in Figure 2, and showing the construction of the floating plate and the means for supporting the telephone handset; and, Figure 4 is a wiring diagram of the electrical circuits involved in this invention.

With continuing reference to the accompanying drawings wherein like reference numerals designate similar parts throughout the various views, the reference numeral 10 generally designates a public pay telephone of conventional construction which is provided with a telephone handset 12 having a mouthpiece 14 and an earpiece 16.

The device comprising the present invention includes a casing 18 having a partition wall 20 therein. The front wall 22 of the casing is provided with an upper opening 24 and a lower opening 26 therethrough. Secured to the partition wall 20 by means of a plate 28 is a conventional connector 30. There is an aperture through the partition wall 20 in alignment with the connector 30 in order that a source of germicidal rays such as an ultra-violet lamp 32 may be secured within the connector 30. A filling 34 of metallic foil such as aluminum foil or the like is placed in the casing 18 between the partition wall 20 and the front wall 22. This filling serves to reflect and thoroughly distribute the rays emanating from the ultra-violet lamp 32. The connector 30 is connected by means of a conductor 36 to the primary coil A of a high voltage transformer 38. The primary coil A of the transformer is further connected by means of a conductor 40 to a micro-switch 42 carried on a plate 44 within the casing 18 and suspended from the front wall 22. The switch is electrically connected with the lamp 32 by means of a conductor 46 which is terminally attached to the switch 42 and to the contact members of the connector 30. The secondary coil B of the transformer 38 is electrically connected to a suitable source of power, not shown.

The telephone 10 is provided with a conventional switch actuating support prong 48 which is adapted to support the handset 12 by engagement with the underside of the earpiece 14. This support prong or support member 48 extends through the casing 18 and a slot 50 is formed in the partition wall 20 permitting movement thereof. The support member 48 is adapted to engage the micro-switch 42 so as to complete an operative electrical circuit from the transformer to the source of germicidal rays by actuating the lamp 32. When the receiver is lifted off the hook, prong, or support member 48 the micro-switch 42 will open thus breaking the circuit to the lamp 32.

There is provided a supporting plate 52 which performs a valuable and important function of this invention. This supporting plate 52 is of somewhat larger size than the casing and is provided with a peripheral flange 54 adapted to overlie the front wall 22 of the casing. A plurality of coil springs 56 are terminally attached by any suitable means to the floating plate 52 and to the front wall 22. The floating plate 52 is provided with apertures 58 and 60 therethrough which are adapted to align with the openings 24 and 26 in the front wall 22. The apertures 58 and 60 are of somewhat smaller size than the openings 24 and 26 thus insuring that the openings in the casing will be somewhat closed and thus provide a satisfactory cover plate to the casing while permitting entrance of the earpiece 14 and the mouthpiece 16. The necessary movement of the arm 48 requires that the openings 24 and 26 be somewhat larger than the apertures 58 and 60 but the floating plate 52 may also move to compensate for the motion of the hook or support member 48.

Since from the foregoing, the construction and advantages of this sterilizing attachment for telephones are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to that fall within the scope of the appended claims.

What is claimed as new is as follows:

1. A sterilizing attachment for telephone handsets comprising a casing, telephone mouthpiece and earpiece receiving openings in said casing, a source of germicidal rays in said casing, a switch controlling said source of germicidal rays carried by said casing, a switch actuating telephone support member extending into said casing, said support member engaging said switch to actuate said source of germicidal rays when said telephone handset is placed in said openings and on said support member, a floating plate having apertures therethrough and resilient means holding said plate outwardly from and in spaced relationship to said casing with said apertures in alignment with said openings, said resilient means including coil springs terminally attached to said plate and said casing, and a reflector filler in said casing.

2. A sterilizing attachment for telephone handsets comprising a casing, telephone mouthpiece and earpiece receiving openings in said casing, a source of germicidal rays in said casing, a switch controlling said source of germicidal rays carried by said casing, a switch actuating telephone support member extending into said casing, said support member engaging said switch to actuate said source of germicidal rays when said telephone handset is placed in said openings and on said support member, a floating plate having apertures therethrough, resilient means holding said plate in relationship to said casing with said apertures in alignment with said openings, said resilent means including coil springs terminally attached to said plate and said casing, said apertures being smaller than said openings.

3. A sterilizing attachment for telephone handsets comprising a casing, telephone mouthpiece and earpiece receiving openings in said casing, a source of germicidal rays in said casing, a switch controlling said source of germicidal rays carried by said casing, a switch actuating telephone support member extending into said casing, said support member engaging said switch to actuate said source of germicidal rays when said telephone handset is placed in said openings and on said support member, a floating plate having apertures therethrough and resilient means holding said plate in relationship to said casing with said apertures in alignment with said openings, said switch being connected to said source of germicidal rays and the secondary coil of a high voltage transformer in said casing, said secondary coil of said transformer being connected to said source of germicidal rays to complete an operative electrical circuit, the primary coil of said transformer being connected to a source of power.

4. A sterilizing attachment for telephone handsets comprising a casing, telephone mouthpiece and earpiece receiving openings in said casing, a source of germicidal rays in said casing, a switch carried by said casing, a switch actuating telephone support member extending into said casing, said support member engaging said switch to actuate said source of germicidal rays when said telephone handset is placed in said openings and on said support member, a floating plate having apertures therethrough and resilient means holding said plate in relationship to said casing with said apertures in alignment with said openings.

References Cited in the file of this patent

UNITED STATES PATENTS

| | | |
|---|---|---|
| 872,204 | Shrader | Nov. 26, 1907 |
| 2,316,540 | Danley et al. | Apr. 13, 1943 |
| 2,495,034 | Sullivan | Jan. 17, 1950 |
| 2,616,097 | Smith | Nov. 4, 1952 |

FOREIGN PATENTS

| | | |
|---|---|---|
| 954,247 | France | Dec. 21, 1949 |